June 28, 1966   C. H. WILLSEY ETAL   3,258,105
ARTICLE HANDLING APPARATUS
Filed June 18, 1964   2 Sheets-Sheet 1
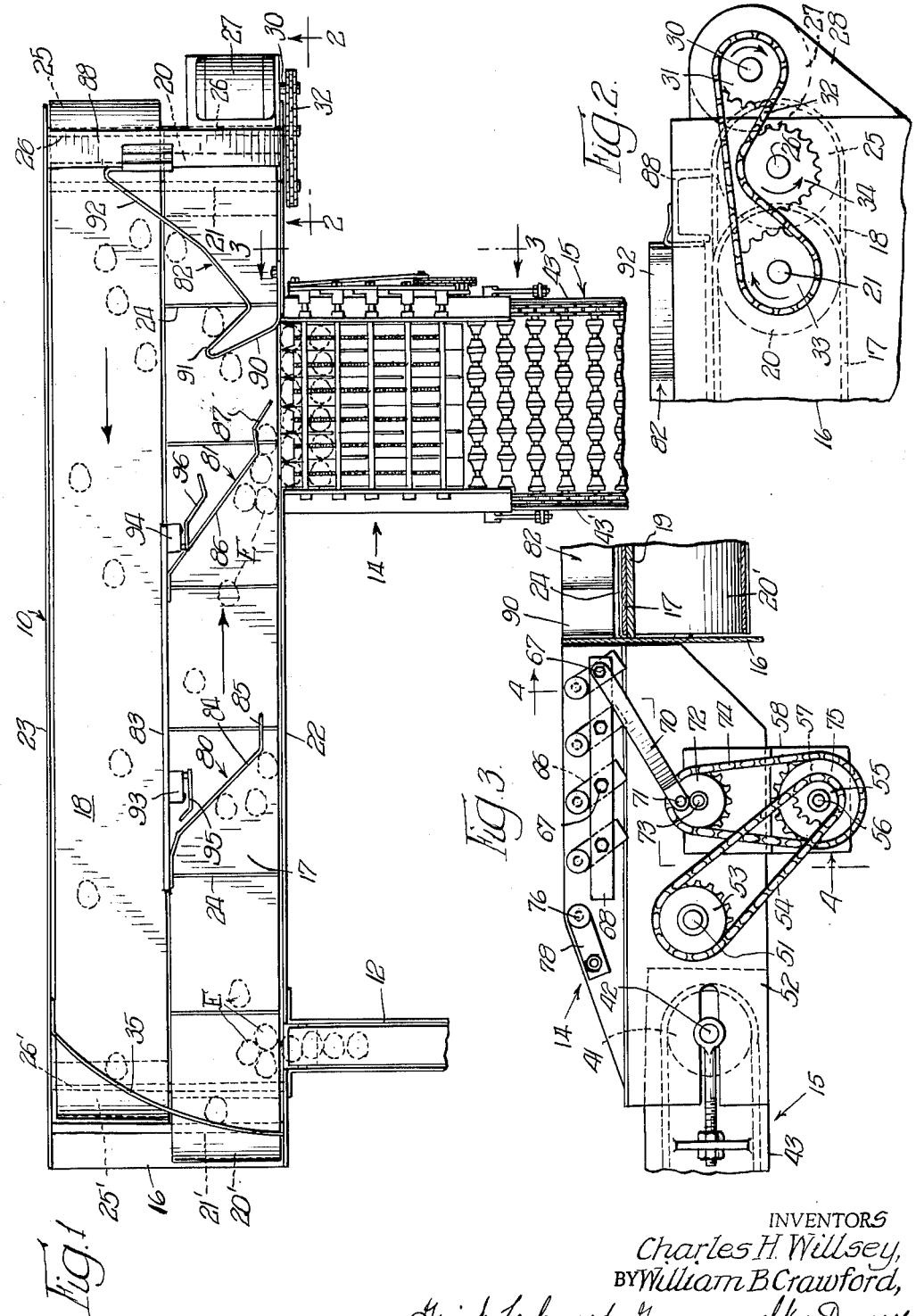
INVENTORS
Charles H. Willsey,
BY William B. Crawford,

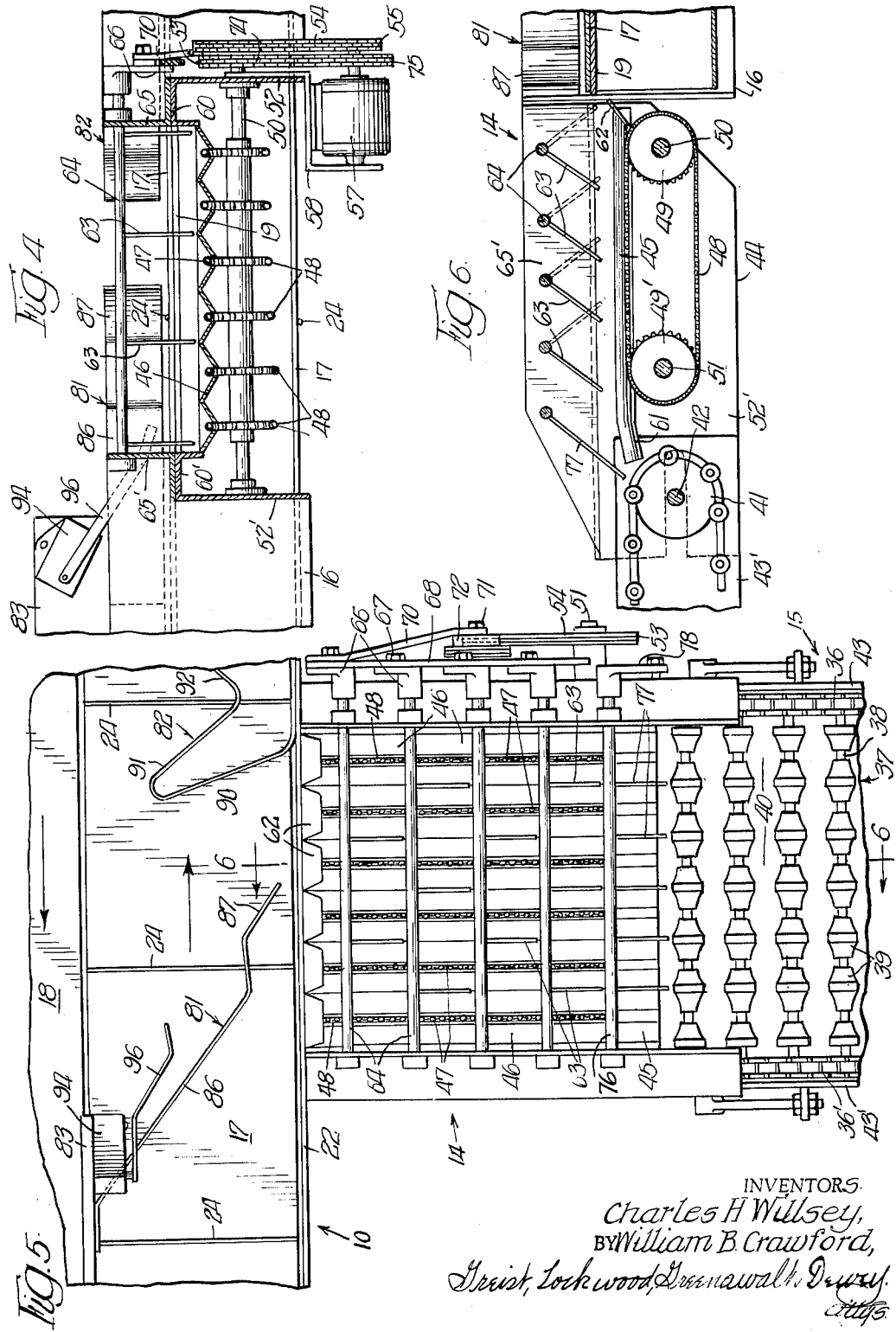

United States Patent Office 3,258,105
Patented June 28, 1966

3,258,105
ARTICLE HANDLING APPARATUS
Charles H. Willsey and William B. Crawford, Topeka, Kans., assignors, by mesne assignments, to Norris Grain Company, Chicago, Ill., a corporation of Illinois
Filed June 18, 1964, Ser. No. 376,080
11 Claims. (Cl. 198—33)

This invention relates to apparatus for handling articles and is more particularly concerned with improvements in apparatus for feeding articles into the pockets of a multiple row conveyor and arranging the articles in predetermined relation in the pockets.

It is a general object of the invention to provide improved conveying and transfer apparatus for receiving articles, such as eggs, in random arrangement and for feeding the articles into rows of pockets on a multiple line conveyor while simultaneously arranging the articles so that they are in predetermined position in the pockets and in row forming multiple line relation.

It is a more specific object of the invention to provide a conveyor apparatus and associated mechanism for receiving eggs in random arrangement and for feeding the eggs into the pockets of a multiple line conveyor so that the eggs are arranged in successive transverse rows with their long axes extending generally transversly of the conveyor.

It is a further object of the invention to provide apparatus for supplying eggs to the pockets of a multiple line conveyor for feeding an egg washing machine, or the like, where the eggs are arranged in transverse row formation with their long axes generally parallel and with associated mechanism for controlling the supply of eggs and insuring that successive rows of eggs are delivered to the conveyor so as to maintain the latter constantly filled with eggs.

It is a still further object of the invention to provide a transfer apparatus for delivering eggs from a supply thereof where they are in random arrangement to a conveyor having pockets for receiving the eggs in multiple line and transverse row arrangement wherein the transfer apparatus includes a pair of relatively wide belts which are driven in opposite directions and provide horizontally moving tables in side-by-side relation with the one belt receiving the eggs at one end thereof and having associated means for guiding the eggs into the pockets in the conveyor and for diverting excess eggs onto the other belt which returns them to the receiving end of the first belt together with mechanism for discontinuing the delivery of the eggs to the first belt when the number thereon exceeds that required for continuous delivery of eggs to the conveyor so as to maintain a constant flow of the eggs and keep the conveyor pockets filled.

It is another object of the invention to provide an egg transfer and orienting apparatus for receiving eggs in random arrangement and for placing the eggs in the pockets of a traveling conveyor in transverse rows with their long axes arranged transversely of the conveyor wherein the apparatus includes means for agitating the eggs as they are advanced so as to insure that there is a constant movement or flow of the eggs from receiving end of the apparatus to the traveling conveyor and jamming and piling up of the eggs are avoided.

These and other objects and advantages of the invention will be apparent from a consideration of the egg transfer and orienting apparatus which is shown by way of illustration in the accompanying drawings, wherein:

FIGURE 1 is a plan view of an egg transfer and orienting apparatus associated with a conveyor for an egg washing machine or other processing equipment which incorporates therein the principal features of the invention;

FIGURE 2 is a fragmentary side elevation taken generally on the line 2—2 of FIGURE 1, to an enlarged scale;

FIGURE 3 is a fragmentary elevational view taken generally on the line 3—3 of FIGURE 1, to an enlarged scale;

FIGURE 4 is a cross section taken on the line 4—4 of FIGURE 3;

FIGURE 5 is a plan view, to an enlarged scale, showing particularly the conveyor loading and egg orienting portion of the apparatus; and FIGURE 6 is a section taken generally on the line 6—6 of FIGURE 5.

Referring first to FIGURE 1 of the drawings, there is illustrated an egg transfer and orienting apparatus which is particularly designed for providing a pocketed conveyor for a washing machine or other egg processing equipment with a continuous supply of eggs in predetermined arrangement. In the apparatus shown, a transfer table or assembly 10 receives a supply of eggs E from a belt conveyor 12 which deposits them in random arrangement at one end of the table 10. The eggs are delivered at the opposite end of the table 10 to an orienting and positioning apparatus 14 which is interposed between the side of the table 10 and the receiving end of a multiple line conveyor 15. The conveyor 15 may be an infeed conveyor for an egg washing machine such as disclosed in Patent No. 2,979,746, dated April 18, 1961. The infeed or supply conveyor 12 may be positioned on either side of the transfer table 10 and may be the belt conveyor shown or any other apparatus for depositing eggs onto top surface of the table 10. Eggs may be supplied to the conveyor 12 from any source such as an egg collecting system in a mechanized hen house. The eggs may, of course, be supplied to the end of the table 10 manually.

The transfer table 10 comprises a supporting frame structure 16 (FIGURES 1, 2, 3 and 5) on which there is mounted a pair of relatively wide, flat, traveling belts 17 and 18 which are arranged with their uppermost runs in side-by-side coplanar relation and supported on a top frame plate 19 so as to form a substantially horizontal table surface. The belt 17 is mounted on a pair of longitudinally spaced end support rollers 20 and 20' which are carried on cross shafts 21 and 21', the latter being journaled at their opposite ends in parallel, oppositely disposed side frame plates 22 and 23 forming part of the supporting structure 16 and disposed with their upper margins extending above the top surface of the belts 17 and 18 a sufficient distance to form side guides for containing the eggs on the belt surfaces. The belt 17 is provided with a plurality of longitudinally spaced, transversely extending cross rods or bar members 24 which are secured to the belt surface. The rods 24 are of relatively small cross section and are preferably round steel or plastic. They are secured to the belt surface in any convenient manner and spaced so as to insure that the eggs move along with the belt as the latter advances. These cross rods or bars also help to break up any jamming and create agitation which helps keep the eggs moving. The belt 18 is mounted on end support rollers 25 and 25' which are carried on cross shafts 26 and 26' journaled at their opposite ends in the side frame plates 22 and 23. A drive motor 27 is mounted at one end of the table 10 on a bracket 28 secured to the frame structure 16 with its power shafts 30 having a sprocket 31 connected by drive chain 32 with sprockets 33 and 34 on the ends of the cross shafts 21 and 26, respectively. The chain 32 is engaged with the sprockets 33 and 34 so as to turn the same in opposite directions and to cause the top runs of the belts 17 and 18 to travel in opposite directions. At the other end of the table 10 an uppstanding curved plate 35 extends between the top margins of the plates 22 and 23 so as to form a guide for diverting eggs from the belt 18 to the forwardly traveling belt 17. The eggs are advanced on the table 10 by the belt 17 to the conveyor loading station at the other end of the table 10 and excess or overflow eggs are diverted into the belt 18 and returned to the receiving end of the belt 17. The mechanism for controlling the movement of the eggs on the belt 17 will be hereinafter described.

The conveyor 15 (FIGURES 1, 3, 5 and 6) to which the eggs are to be fed comprises a pair of laterally spaced endless chains 36, 36' which are connected by longitudinally spaced, transversely extending cross bar assemblies 37 each of which includes a small diameter support bar or rod 38 having axially spaced, spool-like members 39 mounted thereon which are aligned so as to form between each two adjacent cross bar assemblies a series of transversely spaced pockets 40 for accommodating a row of eggs with the pockets 40 being longitudinally aligned. The conveyor structure, as shown, as constructed in the same manner as the egg supporting conveyor for the egg washing apparatus which is described in Patent No. 2,979,746 and reference may be had thereto for details of the conveyor. The conveyor chains 36 and 36' are supported at the receiving end on end sprockets 41 mounted on a cross shaft 42 extending between upstanding, laterally spaced side plates 43 and 43' which constitute part of the supporting frame structure for the conveyor 15, the latter having its end telescoped into the end of the supporting frame structure 44 for the egg orienting and arranging apparatus 14. The orienting apparatus 14 receives the eggs from the conveyor belt 17 and moves them into row arrangement with their axes extending transversely in general alignment in each row while advancing the eggs to the pockets 40 in the conveyor 15. The conveyor 15 is preferably driven from its other end in a suitable manner and at the desired speed for advancing the eggs to the infeed conveyor for the washing machine or to other apparatus with which the conveyor 15 is associated.

The orienting and arranging apparatus 14 which, in the form of the apparatus shown, extends between the side edge of the table 10 and the receiving end of the conveyor 15, comprises a horizontally disposed tray 45 (FIGURE 4, 5 and 6) which is shaped to provide a plurality of relatively shallow parallel egg accommodating troughs 46. Each trough 46 has in the bottom thereof an elongate slot 47 for accommodating an egg advancing and orienting chain 48 of the type which is characterized by a plurality of pivotally connected spheres or bead members. The bead chains 48 are mounted on pairs of sprockets 49 and 49' carried on spaced parallel cross shafts 50 and 51. The shafts 50 and 51 are journaled at their opposite ends in the side plates 52 and 52' of the supporting frame 44 and the sprockets are axially spaced thereon. The shaft 50 is an idler shaft while the shaft 51 constitutes a drive shaft for the chains 48 and is extended at one side of the machine beyond the side plate 52 to receive a sprocket 53 (FIGURE 3) which is connected by the drive chain 54 with the sprocket 55 on the power shaft 56 of a drive motor 57 (FIGURE 4) mounted on a supporting bracket 58 depending below the frame structure 44. The tray 45 is supported on top flanges 60 and 60' of the side plates 52 and 52' so that the upper runs of the chains 48 extend through the slots 47 in the troughs 46 a sufficient distance to engage eggs delivered into the troughs 46 from the belt 17. The leading or forward end of the tray 45 is turned downwardly slightly at 61 so that the eggs roll into the pockets 40 on the conveyor 15 as they are advanced in the troughs 46. A small inclined plate 62 is arranged at the entrance end of each trough 46 so as to guide an egg into the latter as it rolls off of the belt 17.

A plurality of agitator fingers 63 (FIGURES 4, 5 and 6) are mounted on cross shafts 64 which are journaled in the upstanding legs of oppositely disposed, bracket forming angle bar supports 65 and 65' which are mounted on the flanges 60 and 60' of the frame plates 52 and 52'. The agitating fingers 63 may be formed of nylon or a similar plastic material and they are arranged in axially spaced relation on the supporting cross rods 64 so that the fingers 63 on each rod 64 are staggered relative to the fingers 63 on the adjacent rod, with a finger between every other row of eggs. The rods 64 are journaled for rotation in the supporting angle brackets 65 and 65' and are extended at one end and each provided with an arm 66 which is pivotally connected at 67 to a horizontal bar member 68. A link bar 70 (FIGURES 3, 4 and 7) is pivotally connected at one end to one of the pivots 67 and at the other end to an eccentric pivot 71 on a sprocket 72. The sprocket 72 is mounted on a stub shaft 73 which is journaled in the motor supporting bracket 58 and a chain 74 connects the sprocket 72 with a sprocket 75 on the motor drive shaft 56, so that the motor 57 operates to drive the bead chains 48 and also to impart a reciprocating motion to the bar 68 which oscillates the cross bars 64 and the fingers 63 carried thereon to agitate the eggs and assist in orienting the same in the troughs 46. A cross shaft or bar 76 is mounted at the leading end of the tray 45 which is rotatably journaled in the bracket members 65 and 65' and carries a plurality of spaced, depending fingers 77. The fingers 77 which may be of the same character as fingers 63 are somewhat longer than the fingers 63 and depend between each of the troughs 46 on the tray 45 so as to serve as separators and insure that the eggs are in position to move into the pockets 40 on the conveyor 15. The cross rod 76 is extended at one side of the apparatus and carries a short arm 78 on the free end of which a weight is provided so as to bias the fingers 77 towards the tray 45.

The traveling belt 17 has associated with it egg diverting members in the form of two spring arms 80, 81 and a diverter plate 82 which are spaced along the belt. The arms 80 and 81 are mounted on a bracket plate 83 which is upstanding from the conveyor frame plate 19 between the center edges of the two top runs of the belts 17 and 18. The diverting arms 80 and 81 are each formed of a strip of relatively thin, flexible spring plate material. The arm 80 is located between the two conveyors 12 and 15 and spaced above the top surface of the belt 17 a sufficient distance to clear the cross bars 24. It has one end anchored to the bracket plate 83 and a middle portion 84 which extends diagonally across the upper run of the belt 17 with a small end section 85 which is normally disposed approximately parallel with the side plate 22 and space therefrom a distance approximately the diameter of an egg. The arm 80 diverts the eggs toward the side plate 22 and will spring back toward the bracket plate 83 under pressure of the oncoming eggs in the belt 17 if the supply builds up adjacent the same. The diverting arm 81 is similar to arm 80 and is located so that the free end extends to approximately the center line of the orienting device 14. The arm 81 is anchored at its inner end to the bracket plate 83 and a middle portion 86 extends diagonally across the belt 17 to a bent end portion 87 which is shaped as shown so as to cradle an egg and direct it into one of the middle troughs 46 in the tray 45. The adjoining portions of the arm 81 guide oncoming eggs into the end or side troughs 46. The rigid diverter member 82 is fastened at its inner end to a frame cross bar 88 and at its outer end to the side frame plate 22. It extends vertically and is slightly spaced above the belts 17 and 18 to clear the bars 24. The arm 82 is bent to provide a portion 90 extending at an angle of approximately 70° inwardly of the side edge of the belt 17 so as to urge oncoming eggs into the troughs 46 in the tray 45. The arm portion 90 extends to the inner end of a reversely bent portion 91 which faces toward the belt 18 and is relatively short. The outer end of the portion 91 joins one end of a relatively long, slightly bent portion 92, the juncture of the two portions being approximately a right angle, and portion 92 also facing toward the belt 18 so that eggs which pile up in front of the arm portion 90 are diverted by the portions 91 and 92 onto the belt 18 which returns the excess eggs to the other end of the table 10 where the guide member 35 moves the eggs onto the receiving end of the belt 17. Micro switches 93 and 94 are mounted on the bracket plate 83 adjacent the diverting arms 80 and 81 with operating fingers or levers 95 and 96 positioned relative to the arms 80 and 81 so that when the belt receives too many eggs and the arms 80 and 81 are pushed toward the center of the table 10 by pressure of oncoming eggs the switches 93 and 94 are operated and actuate a control circuit (not shown) to stop the belt 12 and interrupt the flow of eggs to the belt 17 until enough eggs are cleared away to relieve the pressure on the arms 80 and 81 and operate the switches 93 and 94 to automatically start the flow of eggs to the belt 17.

We claim:

1. Apparatus for transferring eggs from a supply area adjacent one end of a generally horizontal transfer table to a traveling conveyor adjacent the other end of said transfer table which conveyor is characterized by laterally spaced side chains and connecting cross bar assemblies having means for forming spaced parallel rows of transversely aligned egg receiving pockets, said conveyor being arranged at right angles to the transfer table with the egg supporting upper run thereof in a plane below the transfer table, said apparatus comprising a pair of endless transfer belts arranged with their upper runs in parallel coplanar relation and constituting the transfer table, means for driving the belts in opposite directions, means for delivering eggs onto the one belt adjacent the trailing end thereof, a multiple line egg orienting device adjacent the other end of said one belt and interposed between the side of the transfer table and the receiving end of said traveling conveyor, egg diverting means associated with the transfer table for guiding the eggs in random arrangement onto said egg orienting device and said egg orienting device having means for arranging the eggs uniformly in a plurality of separate lines and for advancing the eggs in laterally spaced row forming relation for delivering into the pockets at the end of the traveling conveyor, and said egg diverting means guiding the eggs in excess of a predetermined quantity at said orienting device to said other transfer belt for return to the trailing end of said one belt.

2. Apparatus as recited in claim 1, and means for interrupting the egg delivering means when eggs are delivered to said one belt at a rate greater than required to keep the pockets of the traveling conveyor filled in order to prevent an excessive accumulation of eggs on said one belt.

3. Apparatus as recited in claim 1, and said egg orienting device having means for imparting a rolling motion to the eggs so that they move into row formation and advance along parallel paths which are aligned with lines of pockets on said traveling conveyor.

4. Apparatus for feeding eggs from a supply area on a transfer table to a traveling conveyor disposed at the one side of said transfer table which conveyor is characterized by laterally spaced side support members and connecting cross bar assemblies having means for forming spaced rows of transversely aligned egg receiving pockets, said conveyor being arranged to travel in a path at right angles to the transfer table with the upper run thereof in a plane slightly below the transfer table and advancing away from said transfer table, said transfer table comprising a pair of relatively wide endless transfer belts mounted on end supports with their upper runs disposed in parallel side-by-side relation, means for operating the belts so that the top runs advance in opposite directions, means for delivering eggs in random arrangement to a supply area on the one belt which is disposed on the same side of the table as the traveling conveyor, an egg orienting device interposed between the side of the transfer table and the receiving end of said traveling conveyor, means associated with said one belt for guiding the eggs onto said egg orienting device and said egg orienting device comprising a tray disposed generally horizontally and having a plurality of parallel, longitudinally extending shallow troughs for receiving eggs from said transfer table in longitudinal alignment, each of said troughs having a bottom slot extending lengthwise thereof and bead type endless traveling chains mounted with their top runs in said slots so as to engage eggs which roll into said troughs, means to drive the chains so as to advance the eggs with a rolling motion toward the ends of the troughs and into the egg receiving pockets of said traveling conveyor, cross bars mounted above the tray having depending fingers thereon which extend between the troughs, and drive means for oscillating the cross bars to agitate the eggs and cause them to roll into the troughs for advance and orientation by the traveling chains.

5. Apparatus for transferring eggs from a supply area adjacent one end of a transfer table to a traveling conveyor adjacent the other end of said transfer table which conveyor is characterized by laterally spaced side chains and connecting cross bar assemblies having means for forming spaced rows of pockets for receiving eggs with their axes extending transversely of the path of travel to the conveyor, said conveyor being arranged at right angles to the transfer table with the upper run thereof in a plane below the transfer table, said transfer table comprising a pair of endless transfer belts of substantial width arranged with their upper runs in side-by-side coplanar relation, means for operating the belts so that the top runs advance in opposite directions, means for delivering eggs onto the one belt which is at the same side of the table as the traveling conveyor so that the eggs are advanced toward the traveling conveyor, means for diverting eggs in excess of a predetermined quantity from said one belt to the other belt for return to the trailing end of said one belt, an egg orienting device interposed between the side of the transfer table and the receiving end of said traveling conveyor, spring arm means mounted above said one belt for moving the eggs to the side of the belt, a second spring arm means mounted above said one belt in advance of said first spring arm means for moving the eggs onto said egg orienting device and said orienting device having parallel troughs with egg engaging chains in the bottoms thereof and drive means for said chains whereby to advance the eggs in laterally spaced rows with a rolling motion so as to align the eggs uniformly for delivery into the pockets of the traveling conveyor.

6. A transfer apparatus as recited in claim 5, and mechanism associated with the belts for discontinuing the delivery of the eggs when the supply of eggs exceeds that required for continuous delivery of eggs to the conveyor and for resuming the delivery of eggs when the supply is reduced so as to maintain a constant flow of the eggs sufficient to fill all the conveyor pockets.

7. Apparatus for supplying eggs to a traveling conveyor which conveyor is characterized by a plurality of egg receiving pockets arranged in transversely aligned relation so as to form longitudinally spaced rows on the conveyor, said feeding means comprising an upright supporting structure at the receiving end of said conveyor, a pair of traveling belts of substantial width mounted on said structure with their upper run in parallel side-by-side relation and forming a generally horizontal table, an egg orienting device interposed between the egg receiving end of the conveyor and the outside edge of one of the traveling belts, means for delivering eggs in random arrangement to said one traveling belt, means for driving said one belt to advance the eggs to a position opposite the orienting device, means at said orienting device for diverting eggs in excess of the number accepted by said orienting device to said other traveling belt for return to said one traveling belt, resilient egg diverting arms disposed in longitudinally spaced relation and extending diagonally across said one belt for moving the eggs to the outside edge thereof for delivery to the orienting device, said orienting device having means for agitating the eggs, for arranging them in laterally spaced row formation and for advancing them with a rolling motion into longitudinally aligned relation with the pockets in the conveyor for delivery to said pockets.

8. Apparatus as recited in claim 7, and mechanism associated with said egg diverting arms for discontinuing the delivery of the eggs when the delivery of eggs to the conveyor causes the egg diverting arms to be moved to a predetermined distance toward the other belt.

9. In egg handling apparatus, an egg conveying and orienting device comprising a tray disposed generally horizontally and having a plurality of parallel, longitudinally extending upwardly opening shallow troughs of generally V-shaped cross section for arranging eggs in longitudinal alignment, each of said troughs having a bottom slot extending lengthwise thereof and a narrow endless traveling chain mounted with the top run thereof in each of said slots, means to drive the chains so as to engage eggs delivered to said troughs and advance the eggs with a rolling motion toward the ends of the troughs, and agitating means to urge the eggs into longitudinal line arrangement in said troughs.

10. In egg handling apparatus, an egg conveying and orienting device comprising a tray disposed generally horizontally and having a plurality of parallel, longitudinally extending upwardly opening shallow troughs of generally V-shaped cross section for receiving eggs in longitudinal alignment, each of said troughs having a bottom slot extending lengthwise thereof and an endless traveling chain mounted with the top run in each of said slots, means to drive the chains so as to advance eggs delivered to the troughs with a rolling motion, and egg agitating means mounted above said tray for urging the eggs into longitudinal line arrangement in said troughs.

11. In egg handling apparatus, an egg orienting device comprising a tray disposed generally horizontally and having a plurality of parallel troughs of substantial length and upwardly opening, generally V-shaped cross section for positioning the eggs in longitudinal alignment, each of said troughs having a bottom slot extending lengthwise thereof and endless traveling chains mounted with their top runs in said slots, means to drive the chains so that the top runs thereof engage eggs moved into the troughs and advance the eggs with a rolling motion toward the ends of the troughs thereby to cause the eggs to assume a position in longitudinal alignment in the troughs and with their long axes extending generally transversely of the troughs, and finger members disposed between the troughs for urging the eggs into longitudinal line arrangement in said troughs.

References Cited by the Examiner

UNITED STATES PATENTS

| | | | |
|---|---|---|---|
| 1,385,255 | 12/1920 | Duber | 198—232 |
| 2,753,976 | 7/1956 | Fitzmaurice | 198—33.1 |
| 2,787,358 | 4/1957 | Cox | 198—30 |
| 3,050,174 | 8/1962 | Billett | 198—30 |
| 3,109,469 | 11/1963 | Urschel | 198—33.1 |

EVON C. BLUNK, *Primary Examiner.*

RICHARD E. AEGERTER, *Examiner.*